(12) United States Patent
Adams et al.

(10) Patent No.: US 7,231,199 B2
(45) Date of Patent: Jun. 12, 2007

(54) DATA PROTECTION FOR APPLICATIONS ON A MOBILE ELECTRONIC DEVICE

(75) Inventors: Neil Adams, Waterloo (CA); Herb Little, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 72 days.

(21) Appl. No.: 10/787,239

(22) Filed: Feb. 27, 2004

(65) Prior Publication Data
US 2005/0193066 A1  Sep. 1, 2005

(51) Int. Cl.
*H04Q 7/20* (2006.01)
(52) U.S. Cl. .............. 455/403; 455/412.1; 455/412.2; 707/1; 709/206
(58) Field of Classification Search ............. 455/403, 455/414.1, 412.1, 418, 419; 707/10, 100, 707/104.1, 1; 705/50–53; 719/313–316; 709/201–203, 205; 718/100–105; 717/178
See application file for complete search history.

(56) References Cited

U.S. PATENT DOCUMENTS

| | | | | |
|---|---|---|---|---|
| 5,406,643 | A * | 4/1995 | Burke et al. | 709/243 |
| 2002/0046292 | A1 * | 4/2002 | Tennison et al. | 709/238 |
| 2003/0147369 | A1 * | 8/2003 | Singh et al. | 370/338 |
| 2003/0236769 | A1 * | 12/2003 | Pyhalammi | 707/1 |
| 2004/0260840 | A1 * | 12/2004 | Scian et al. | 709/247 |
| 2005/0075115 | A1 * | 4/2005 | Corneille et al. | 455/456.3 |
| 2005/0193066 | A1 * | 9/2005 | Adams et al. | 709/206 |

FOREIGN PATENT DOCUMENTS

WO   WO 03/079196    9/2003

OTHER PUBLICATIONS

Bernd Mathiske and Daniel Schneider: "Automatic Persistent Memory Management for the Spotless'tm! Virtual Machine on the Palm Connected Organizer" Sun SMLI Technical Reports, No. TR-2000-89, Jun. 2000, pp. 1-18, XP002255754.
Jeff Friesen: "Trash talk, Part 1—Java recycles its memory through garbage collection" Javaworld Online, 'Online! Dec. 7, 2001, pp. 1-9.
Research In Motion Limited: "BlackBerry Security for Lotus® Domino—Version 2.0 with Service Pack 2" Rim Technical White Papers, 2001, pp. 1-12, XP002255756.
Sun: "J2ME Building Blocks for Mobile Devices—White Paper on KVM and the Connected, Limited Device Configuration (CLDC)" Sun White Papers, May 19, 2000, pp. 1-36.
European Search Report for corresponding European Patent Application No. EP04251093, Sep. 29, 2004.
Shiow-Yang Wu and H.S. Cinatit Chao: "Event Engine for Adaptive Mobile Computing" Proceedings of Second International Conference on Mobile Date Management, 2001, pp. 27-38, XP002291221, no month listed.

* cited by examiner

*Primary Examiner*—Jean Gelin
(74) *Attorney, Agent, or Firm*—Ridout & Maybee LLP

(57) ABSTRACT

A method and system for data protection for applications that includes registering applications with a storage cleaning mechanism so that the registered applications can receive notification of impending storage cleaning operations. Upon receiving notification of an impending cleaning operation, the registered applications can release or unreference storage so it can be cleaned of data.

6 Claims, 4 Drawing Sheets

Memory Cleaning
Clean When Holstered:     Yes
Clean When Idle:          Yes
  Idle Timeout:           1 Min.
Show Icon on Home Screen: No Registered Applications:
  Key Store
  Encrypted Messages
  Clipboard
  Address Book Cache

DATA PROTECTION FOR APPLICATIONS ON A MOBILE ELECTRONIC DEVICE

BACKGROUND OF THE INVENTION

The present invention relates to data protection for applications on mobile electronic devices.

A mobile electronic device will typically include a number of applications for performing various functions on the device. These applications may store sensitive data on the memory of the device. A mobile electronic device may also include a memory cleaning mechanism through which memory on the device is periodically cleaned. However, the memory cleaning mechanism may not be aware of sensitive data stored by various applications on the device, and thus may riot clean the memory of sensitive data that it would be desirable to remove from the device for data protection reasons. Protection of sensitive application data is particularly a concern in respect of software applications that are developed for the mobile electronic device by third parties other than the provider of the base operating system and/or virtual machine software used by the mobile electronic device.

Thus, a method and system of memory management for applications that assists the memory cleaning mechanism in cleaning sensitive data associated with applications is desired.

SUMMARY

Examples of the invention include a method and system for data protection for applications that includes registering applications with a storage cleaning mechanism so that the registered applications can receive notification of impending storage cleaning operations. Upon receiving notification of an impending cleaning operation, the registered applications can release or unreference storage so it can be cleaned of sensitive data.

One example embodiment includes a data protection method for software applications on a mobile electronic device, the device having storage for allocation to respective software applications for data storage. The method includes creating and storing a list of selected software applications operating on the mobile electronic device; notifying the selected software applications of an impending storage cleaning operation; and determining, for each selected software application receiving the notification, if any storage allocated thereto is to be released for cleaning during the impending storage cleaning operation and if so releasing the storage for cleaning.

According to another example embodiment, in a mobile electronic device having a plurality of software applications operating thereon, at least some of the applications referencing objects for storing data in memory of the mobile electronic device, is a method for protecting the data. The method includes: registering selected applications; notifying the registered applications upon the occurrence of a trigger event; unreferencing at least some objects referenced by the registered applications based on the notification; and cleaning the memory to remove data stored in any unreferenced objects.

According to another example embodiment is a mobile electronic device that included a microprocessor, a plurality of software applications operable on the microprocessor, and a heap memory for storing objects used by the software applications. A garbage collector module is operable on the microprocessor module for cleaning unreferenced objects in the heap memory. A memory cleaner module is operable on the microprocessor for maintaining a list of registered applications selected from the software applications, and for notifying the registered applications upon the occurrence of a trigger event. The registered applications are responsive to the memory cleaner module for unreferencing at least some of the objects in the heap memory used thereby upon receiving notification from the memory cleaner module upon the occurrence of a trigger event.

Other aspects and features of the present invention will become apparent to those ordinarily skilled in the art upon review of the following description of specific embodiments of the invention in conjunction with the accompanying Figures

BRIEF DESCRIPTION OF THE DRAWINGS

FIG. 5 shows a user interface screen displayed by the memory management system of FIG. 2.

Like reference numerals are used throughout the Figures to denote similar elements and features.

DETAILED DESCRIPTION

Figure 1:
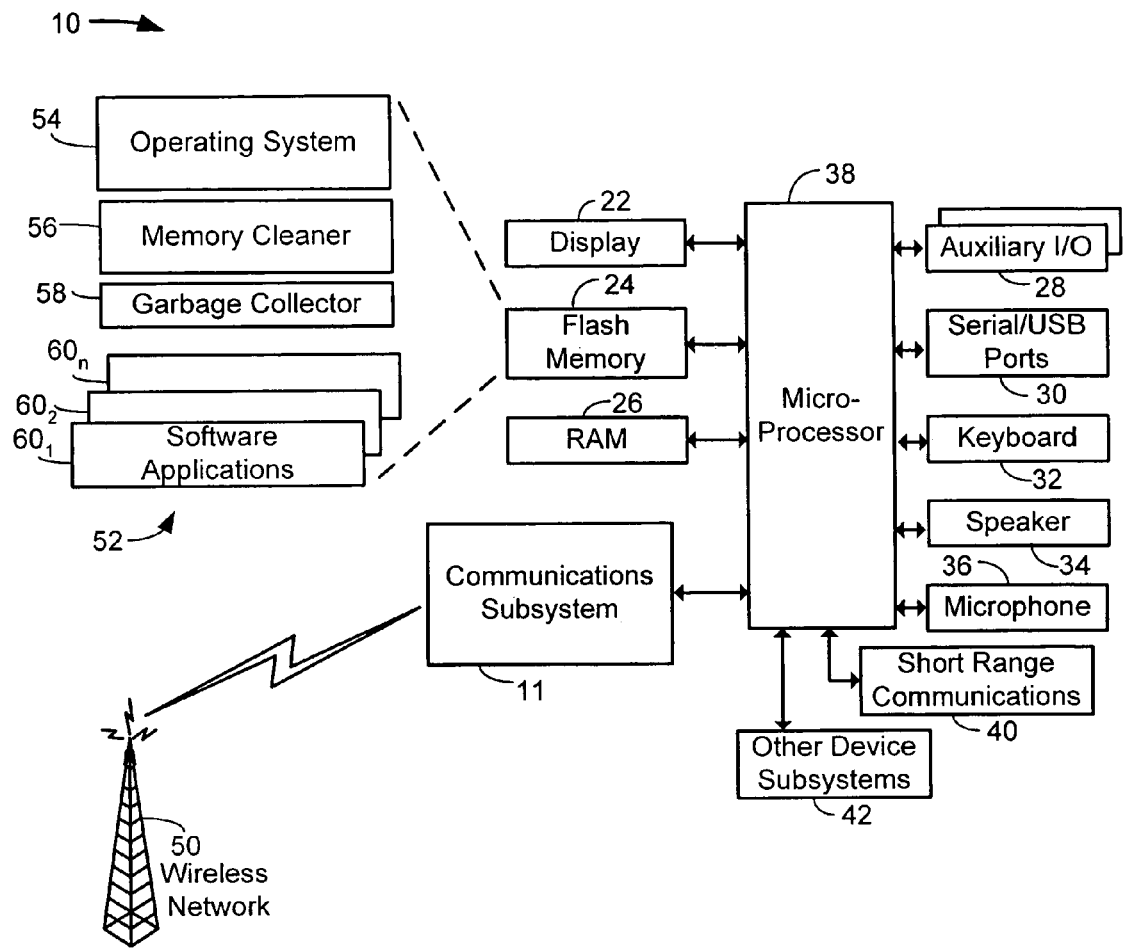
FIG. 1 is a block diagram showing a mobile electronic device to which example embodiments of the invention may be applied.

Referring now to the drawings, FIG. 1 is a block diagram of a mobile electronic device 10 to which the methods and systems described herein may be applied in an example embodiment. The mobile electronic device 10 is a two-way communication device having at least data and, in some embodiments, also voice communication capabilities and/or the capability to communicate with other computer systems on the Internet. Depending on the functionality provided by the device, in various embodiments the device may be a hand-held data communication device, a multiple-mode communication device configured for both data and voice communication, a mobile telephone, a PDA (personal digital assistant) enabled for wireless communication, or a computer system with a wireless modem, among other things. In some embodiments, the systems and methods described herein could be applied to electronics devices that are not enabled for wireless communications, such as non-wireless network enabled PDAs and digital cameras for example.

The device 10 includes a communication subsystem 11 for exchanging wireless communications signals with a wireless network 50. As will be apparent to those skilled in the field of communications, the particular design of the communication subsystem 11 will be dependent upon the communication network in which the device is intended to operate. In devices that are not enabled for wireless communication, communications subsystem 11 may be omitted or inactive.

The device 10 includes a microprocessor 38 that controls the overall operation of the device. The microprocessor 38 interacts with communications subsystem 11 and also interacts with further device subsystems such as the display 22, flash memory 24, random access memory (RAM) 26, auxiliary input/output (I/O) subsystems 28, serial and/or USB port(s) 30, keyboard or keypad 32, speaker 34, microphone 36, a short-range communications subsystem 40 and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Resident on device 10 are various software modules 52, including for example operating system software 54, memory cleaner 56, garbage collector 58, and various software applications $60_1$–$60_n$ (individual software applications may be generically referred to as a software application 60 herein). In an example embodiment, software modules 52 are stored in a persistent store such as flash memory 24 or similar storage element. The software modules 52 or parts thereof may be temporarily loaded into a volatile store such as RAM 26. Received communication signals may also be stored to RAM 26.

The microprocessor 38, in addition to its operating system functions, preferably enables execution of software applications $60_1$–$60_n$ on the device. A predetermined set of applications which control basic device operations, including at least data and voice communication applications for example, will normally be installed on the device 10 during manufacture. Further applications 60, including applications provided by third party vendors other then the provider of device 10, may also be loaded onto the device 10 through the network 50, an auxiliary I/O subsystem 28, serial and/or USB port(s) 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32 in conjunction with the display 22 and possibly an auxiliary I/O device 28. Such composed items may then be transmitted over a communication network through the communication subsystem 11.

Serial and/or USB port(s) 30 in FIG. 1 would normally be implemented in a personal digital assistant (PDA)-type communication device for which synchronization with a user's desktop computer (not shown) is desirable. Such a port 30 would enable a user to set preferences through an external device or software application and would extend the capabilities of the device by providing for information or software downloads to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices.

Wireless mobile network 50 is, in an example embodiment, a wireless packet data network, (e.g. Mobitex™ or DataTAC™), which provides radio coverage to mobile electronic devices 10. Among other things, wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems).

Figure 2:
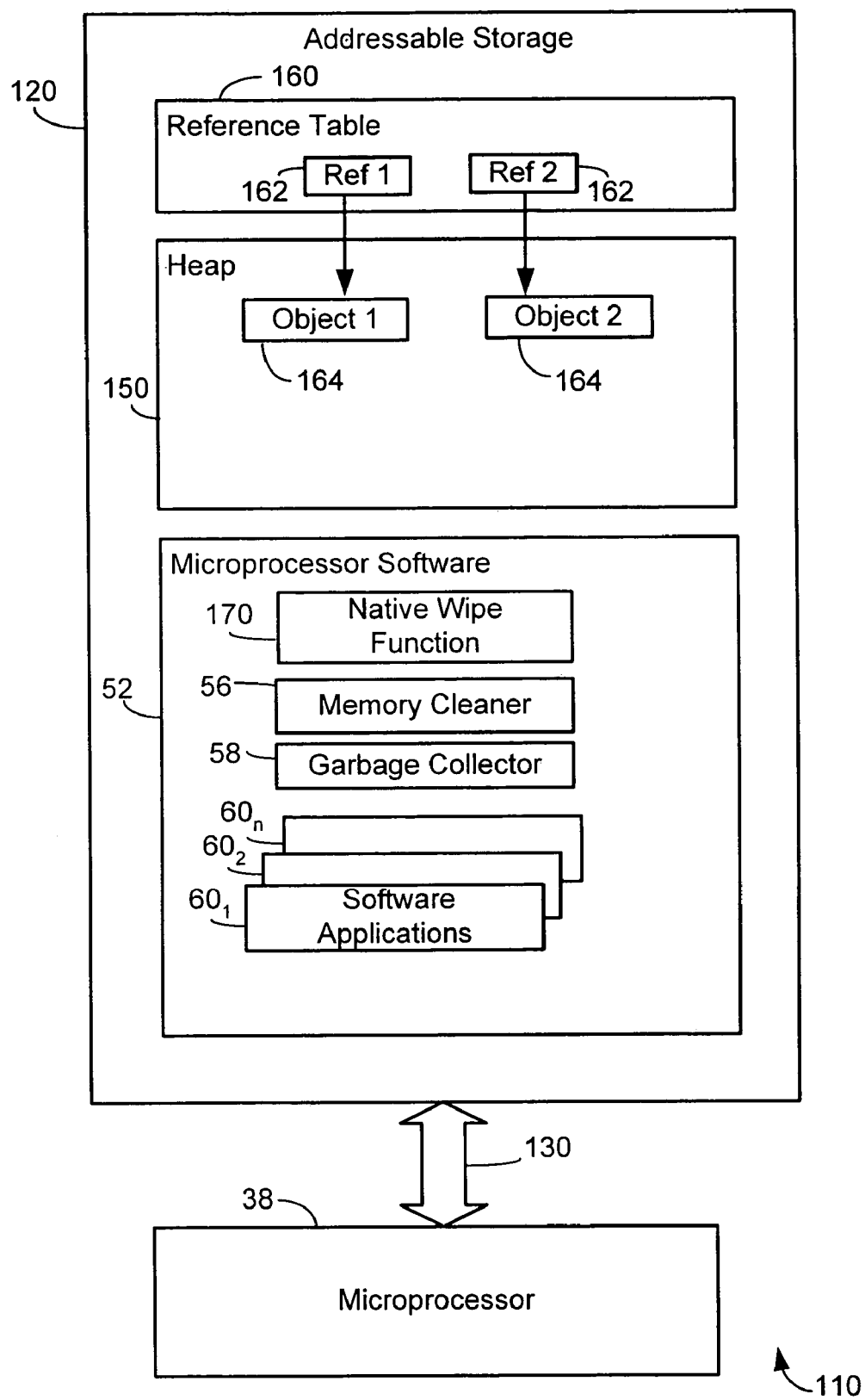
FIG. 2 is block diagram showing a memory management system according to example embodiments of the invention.

FIG. 2 is a block diagram showing an example of a memory management system 110. Although memory management system 110 is illustrated and described herein in the context of mobile communications device 10, many different types of mobile electronic devices may utilize system 110, such as personal digital assistants, cellular phones, wireless two-way communication devices, as well as any device that has applications that store information.

The memory management system 110 of FIG. 2 includes microprocessor 38, and an addressable storage 120 connected to microprocessor 38 by a data bus 130. The addressable storage 120, which may include RAM 26 and persistent flash memory 24, among other things, stores software modules 52, heap 150 and reference table 160.

Software 52 includes a native wipe function 170. The native wipe function 170 can clean the data in a portion of addressable storage 120. As an example, a suitable function in the 'C' programming language is the function 'memset( )', which could be used to write over data with all zeroes, all ones, or with random data to thwart sophisticated memory recovery techniques. Software 52 also includes a garbage collector software module 58 capable of using native wipe function 170, as well as being able to access objects in heap 150 via reference table 160. The software 52 also includes various software applications $60_1$–$60_n$ for implementing various functions on the mobile electronic device 10. By way of non-limiting examples, software applications $60_1$–$60_n$ may customer relationship management applications, streaming information service applications and attachment viewers. The software 52 also includes a memory cleaner module 56 that, as will be described in greater detail below, acts as an interface between at least some of the software applications $60_1$–$60_n$ and the garbage collector 58. Software 52 may be used in many different implementation environments, such as object-oriented environments (e.g., Java).

In an example embodiment, software 52 includes virtual machine software modules and virtual machine software that is capable of interpreting virtual machine instructions found in the virtual machine software modules. In such an embodiment, the garbage collector 58 can be part of the virtual machine software.

When executed, software applications $60_1$–$60_n$ are each allocated a region of addressable storage 120 to use for storing data that is used or generated by the software application 60. More particularly, when a software application 60 is executed, one or more objects 164 for storing data associated with the software is/are allocated in heap 150. The objects 164 may be allocated in RAM 26 or flash memory 24. The objects 164 are accessible through reference table 160 (which in an example embodiment is stored in RAM 26) in that each object 164 has an associated reference entry 162 in reference table 160. Each reference entry 162 includes an address or pointer for its associated object 164. Typically, when an application 60 ceases using a particular object 164, the reference entry 162 that points to the dropped object is nulled out, thereby indicating that the memory previously used by the object has been freed up.

Figure 3:
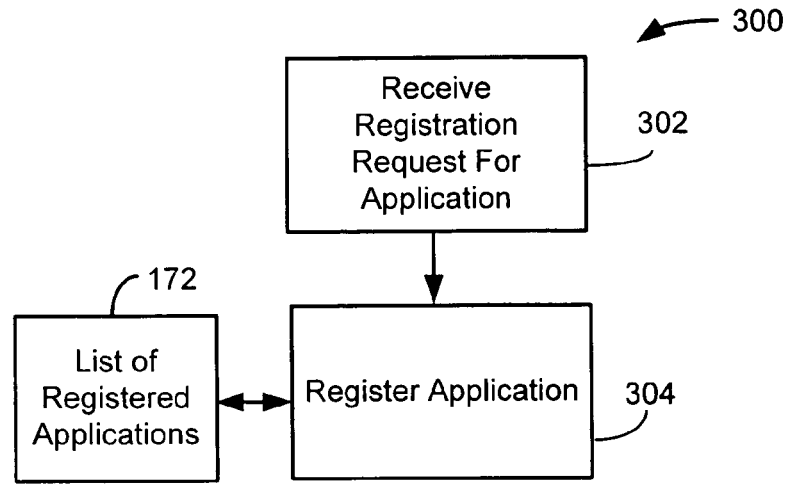
FIG. 3 is a block diagram depicting an application registration method in the memory management system of FIG. 2.

The memory cleaner module 56 provides a mechanism through which applications $60_1$-$60_n$ can register to be notified upon the occurrence of certain predetermined events so that they can then unreference objects in storage 120 to release storage for subsequent cleaning. FIG. 3 depicts an example registration method 300 carried out by memory cleaner module 56. As indicated in step 302, a registration request is received for an application 60, and as indicated in step 304, the application is registered for notification. Registration requests may occur in one or more ways in various embodiments. For example, the memory cleaner module may allow a user of the device 10 to select from a partial or full list of applications $60_1$-$60_n$ those applications that notification is desired for; alternatively, an application 60 may automatically request registration for notification when it is installed on device 10, or each time that it executes, or when it creates data that is categorized according to predetermined standards as sensitive data, and in some embodiments the user may be given the option to opt out of the registration of a specific application. In step 304, the application 60 being registered for notification is stored in a list 172 of registered applications maintained by the memory cleaner module 56. The list 172 may be maintained as an object in storage 120.

Figure 4:
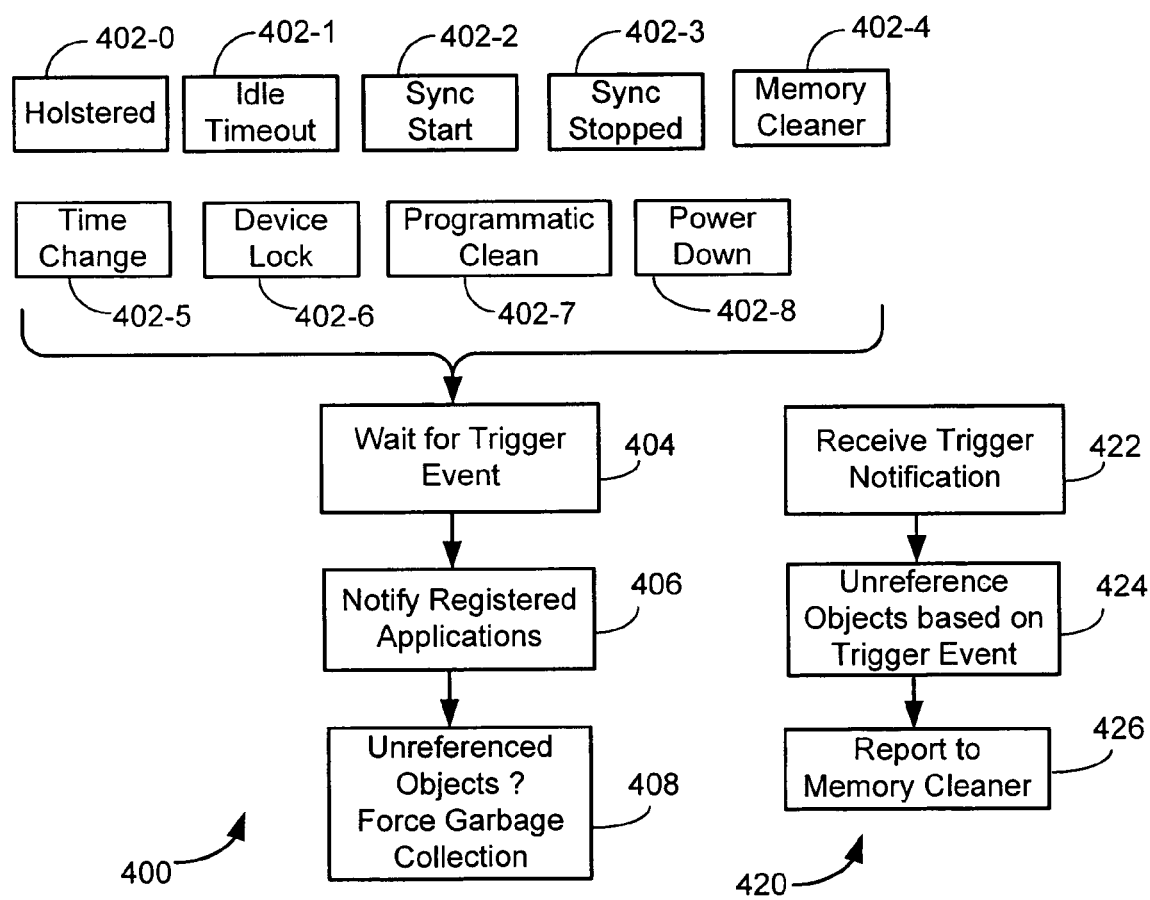
FIG. 4 shows block diagrams of an application notification and object cleaning method in the memory management system of FIG. 2.

Once an application is in the registered application list 172, it will be notified by the memory cleaner module 56 upon the occurrence of predetermined trigger events. FIG. 4 depicts a flow diagram showing an example method 400 implemented by memory cleaner 56 for notifying registered applications and instigating cleaning of objects that are unreferenced by the applications in response to the notification. FIG. 4 also depicts a flow diagram of an example method 420 carried out at individual registered applications upon receiving notification of a trigger event.

As indicated in step 404, the method 400 includes waiting for one of the predetermined trigger events. In example embodiments, trigger events can include, but are not limited to: (a) a holstered event 402-0, which occurs when the mobile electronic device 10 is placed in its associated holster (if so equipped) by the user; (b) an idle timeout event 402-1, which occurs when the mobile electronic device 10 has been left idle by the user for a user configurable time period; (c) a sync start event 402-2, which occurs when a synchronization operation between a desktop computer and the mobile electronic device 10 has begun; (d) a sync stop event 402-3, which occurs when a synchronization operation between the desktop computer and the mobile electronic device 10 has ended; (e) a memory cleaner event 402-4, which occurs when the memory cleaner module 56 itself initiates the notification and cleaning method 400—for example, the memory cleaner module 56 may be configured to initiate method 400 periodically at user configured time intervals; (f) a time change event 402-5, which occurs when the mobile electronic device changes time-zones or the user changes the time on the mobile electronic device; (g) a device lock event 402-6, which occurs when the mobile electronic device has been locked, which may occur due to a number of reasons, such as the user expressly locking the mobile electronic device, or a delay beyond a timeout period in entering a required password; (h) a programmatic clean event 402-7, which occurs when a programmatic clean has been initiated—for example, by calling of a Memory-CleanerDaemon.cleanAll( ) function; and (i) a power down event 402-8, which occurs when the mobile electronic device 10 is about to power down.

As indicated in step 406, upon the occurrence of a trigger event, any software applications $60_1$-$60_n$ that are registered with the memory cleaner module 56 will be notified of the occurrence of the trigger event. In an example embodiment, as part of notification step 406, the registered applications are each passed a value that indicated the type of triggering event that has occurred. For example, a value of "0" may indicate a holstered event 402-0, a value of "1" may indicate an idle timeout event 402-1, and so on.

Method 420 includes steps taken by a registered application upon receiving notification of a triggering event. As indicated in step 422, method 420 begins when the registered application receives notification of a trigger event from the memory cleaner 56. As indicated above, the trigger event notification may include a value that identifies the type of trigger event, such that the registered application can distinguish between different triggering events and determine what objects, if any, need to be cleaned based on the type of triggering event. As indicated in step 424, the registered application unreferences any objects 164 that have been allocated to it that include data that the registered application has determined should be wiped. In an example embodiment, an object 164 is unreferenced by nulling out in reference table 160 the reference 162 to the object 164. In example embodiments, the registered application selectively unreferences objects 164 based on the type of trigger event. For example, a holstered event 402-0 may cause a particular registered application to unreference one object or set of objects allocated to it, a power down event 402-8 may cause the registered application to unreference a different object or set of objects allocated to it, and a programmatic clean event 402-7 may cause the registered application to unreference all data storing objects allocated to the registered application. As indicated in step 426, in an example embodiment, the registered application then reports to the memory cleaner 56 in the event that it has unreferenced any objects 164—for example, the registered application may return a "true" value to the memory cleaner 56 if the registered application unreferences any objects upon receiving a trigger event notification.

Returning again to method 400, after issuing a trigger event notification to all registered applications, as indicated in step 406, the memory cleaner 56 waits to see if any of the registered applications report that they have unreferenced objects 164, and if so, the memory cleaner 56 calls on garbage collector 58 to perform a garbage collection function. In some embodiments, the memory cleaner 56 forces a garbage collection in step 408 without any regard for whether any registered applications have indicated that they have unreferenced objects 164. In some embodiments, the memory cleaner 56 may force a garbage collection upon the occurrence of selected trigger events (for example a memory cleaner event 402-4) regardless of whether any registered applications have indicated that they have unreferenced objects 164, thus ensuring that previously unreferenced objects by all applications (and not just registered applications) are cleaned.

When the memory cleaner 56 forces a garbage collection, the garbage collector 58 identifies unreferenced objects 164 in the heap 150 and calls on the native wipe function 170 to clean the unreferenced objects 164 from the heap. This may be done by setting the object data to zeros, ones or random data. Thus, memory management system 110 allows for data stored by registered applications to be cleaned upon the occurrence of predetermined trigger events, improving data security for the mobile electronic device 10. The registered applications may include selected third party applications.

With reference to FIG. 5, in an example embodiment the memory cleaner module 56 includes an application program interface and is configured to generate a user interface screen 180 on display 22 of device 10. As can be seen in FIG. 5, in an example embodiment the user interface screen 180 includes a visual representation of the list 172 of registered applications. The screen 180 also displays a number of user configurable settings for the memory cleaner 56, including for example, trigger events such as "Clean When Holstered"; and Clean When Idled", which can be activated or deactivated as trigger events by the user. As indicated on screen 180, the user configurable timeout value is displayed to the user. Additionally, the user is given the option of displaying an icon linking to the memory cleaner interface on the device home screen.

The above-described embodiments of the present invention are intended to be examples only. Alterations, modifications and variations may be effected to the particular embodiments by those skilled in the art without departing from the scope of the invention, which is defined by the claims appended hereto.

What is claimed is:

1. A mobile electronic device, comprising:
a microprocessor;
a plurality of software applications operable on the microprocessor;
a heap memory for storing objects used by the software applications;
a garbage collector module operable on the microprocessor for cleaning unreferenced objects in the heap memory; and
a memory cleaner module operable on the microprocessor for maintaining a list of registered applications selected from the software applications, and for notifying at least some of the registered applications upon the occurrence of a trigger event;
the registered applications being responsive to the memory cleaner module for unreferencing at least some of the objects in the heap memory used thereby upon receiving the notification from the memory cleaner module;
and the registered applications are each configured for advising the memory cleaner module if any objects have been unreferenced thereby based on the notification, and the memory cleaner module is configured for causing the garbage collector module to clean unreferenced objects in the heap memory upon being advised by one or more of the registered applications that objects have been unreferenced thereby based on the notification.

2. The mobile electronic device of claim 1 wherein there are a plurality of different types of trigger events upon the occurrence of any one of which the memory cleaner module notifies the registered applications, the notification including an identification of the type of trigger event.

3. The mobile electronic device of claim 2 wherein at least one of the trigger events is selected from the group consisting of: a holstering event that occurs when the device is placed in a corresponding holster an idle timeout event that occurs when the device is left idle by a user thereof for a predetermined time period; a synchronization start event that occurs when the device begins a synchronization operation with a computer a synchronization end event that occurs when the device ends the synchronization operation with the computer; a memory cleaner event that occurs when a memory cleaning operation is initiated on the device; a time change event that occurs when a time setting of the device is changed; a device lock event that occurs when the device is locked; and a power down event that occurs as the device is about to power down.

4. The mobile electronic device of claim 2 wherein at least some of the registered applications are configured for, upon receiving notification from the memory cleaner module, selectively unreferencing objects referenced thereby based on the type of trigger event.

5. The mobile electronic device of claim 1 wherein the device includes a display screen, the memory cleaner module being configured for generating on the display screen a user interface identifying the registered applications.

6. The mobile electronic device of claim 1 wherein at least one of the software applications is configured to automatically register with the memory cleaner module as a registered application when creating a predetermined category of data.

* * * * *